United States Patent
Shost (12) 
(10) Patent No.: US 6,463,951 B2
(45) Date of Patent: Oct. 15, 2002

(54) APPARATUS AND METHOD FOR SEALING A SOLENOID VALVE

(75) Inventor: Mark Anthony Shost, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/725,423

(22) Filed: Nov. 29, 2000

(65) Prior Publication Data

US 2002/0063228 A1 May 30, 2002

(51) Int. Cl.$^7$ .............................................. F16K 31/02
(52) U.S. Cl. .............................. 137/15.18; 251/129.15; 251/129.21
(58) Field of Search ..................... 251/129.15, 129.18, 251/129.21; 123/520, 516, 519; 137/15.18

(56) References Cited

U.S. PATENT DOCUMENTS 4,791,958 A * 12/1988 Brundage .......... 251/129.21 X
5,560,585 A * 10/1996 Krimmer et al. ...... 251/129.21

OTHER PUBLICATIONS

Mark Anthony Shost, "Apparatus and Method for Sealing a Solenoid Valve," Attorney Docket No. DP–302213 filed concurrently with this file. (SN 09/725,396).

* cited by examiner

Primary Examiner—Kevin Lee
(74) Attorney, Agent, or Firm—Margaret A. Dobrowitsky (57) ABSTRACT

An evaporative control valve for a vehicle. The valve has a valve body for containing a solenoid that manipulates a plunger between an open position and a closed position, the plunger has a valve end and an adjustment end. The valve body also has a receiving area, a first port, as well as a conduit for connecting the first port to the receiving area. A port member is received and engaged within the receiving area and the port member provides a passageway from the receiving area to outside the valve body and the valve end seals the passageway when the plunger is in its closed position. The first port is aligned with and provides access to set the stroke of the solenoid.

25 Claims, 6 Drawing Sheets

FIG. 11

APPARATUS AND METHOD FOR SEALING A SOLENOID VALVE

TECHNICAL FIELD

The present invention relates to control valves and more particularly, to an apparatus and method for providing a solenoid actuated valve.

BACKGROUND OF THE INVENTION

Evaporative solenoid control valves (EVAP) control purge flow from a purge canister and the intake manifold of an automotive engine.

One such EVAP valve employs the use of a port member and an ultrasonic attachment process to seal the port member to the solenoid valve and prevent external leaks. However, the use of an ultrasonic weld is problematic in that the welding process creates debris inside the solenoid which may be attributable to the failure of the valve. In addition, the ultrasonic welding process deforms the surface of the solenoid valve which will adversely affect the appearance of the final product.

Other problems encountered with the ultrasonic welding process of the port member to the solenoid valve may include improper positioning of the port of the port member with respect to the solenoid plunger. This may be the source of an undesirable noise associated with the operation of the solenoid valve.

In addition, the sealing of the port member to the solenoid valve assembly provides potential areas for leakage to occur. Moreover, the primary function of an EVAP valve depends on the transfer of gaseous materials from one point to another through the use of an EVAP valve. Accordingly, any leakage will affect the performance of the valve.

Therefore, an EVAP valve's design should prevent potential leakage areas as well as increase the performance and/or cost of the same. Accordingly, an EVAP valve's design should provide ease of assembly and disassembly, exhibit good magnetic flux transfer characteristics, provide an airtight passage from one point to another without impeding air flow, and be cost-efficient.

SUMMARY OF THE INVENTION

An evaporative control valve for a vehicle having a valve body and a solenoid for manipulating a plunger mechanism between an open position and a closed position. The plunger has a valve end for opening and closing a first port into a receiving area. A port member having the first port is secured to the evaporative control valve and the receiving area, and is secured to the valve assembly in order to axially align with the plunger mechanism and the first port.

The above-described and other features and advantages of the present invention will be appreciated and understood by those skilled in the art from the following detailed description, drawings, and appended claims.

DETAILED DESCRIPTION OF THE PREFERRED EMBODIMENT

Figure 1:
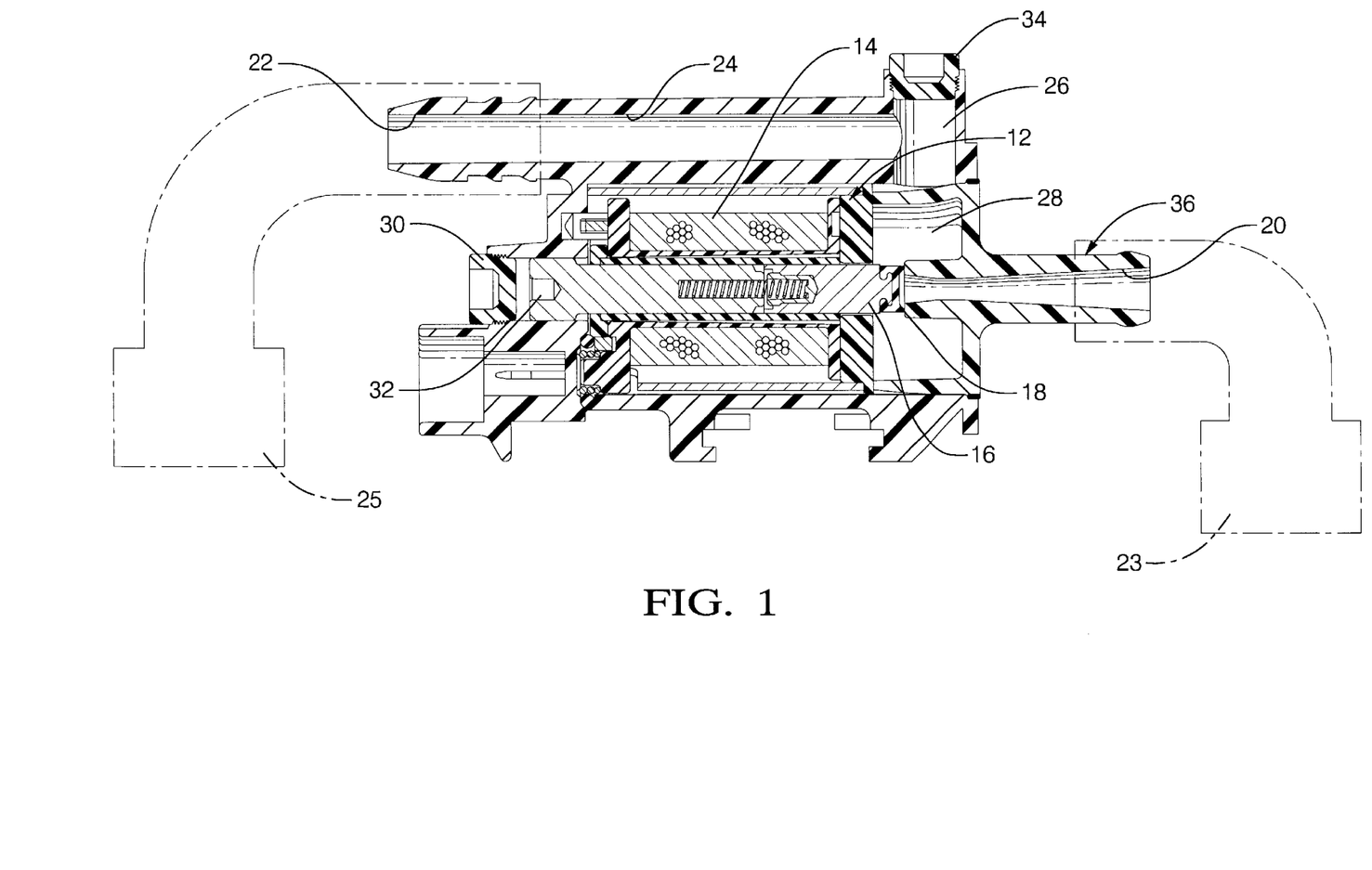
FIG. 1 is a cross-sectional view of a solenoid actuated valve assembly.

Referring now to FIG. 1, a solenoid valve assembly 10 is illustrated. One contemplated use for valve assembly 10 is the insertion of valve assembly 10 intermediate to a canister and an intake manifold of a vehicle. Of course, and as applications may require, valve assembly 10 can be used in numerous applications.

Valve assembly 10 includes a solenoid assembly 12 which in response to a magnetic flux generated by a coil 14, causes a plunger 16 to open and close a valve passageway 18. Valve passageway 18 provides a means for connecting a rear port 20 to a front port 22. Front port 22 is coupled to a charcoal canister 25, and rear port 20 is coupled to an intake manifold 23 for use in an evaporative emission control system of a vehicle.

Figure 2:
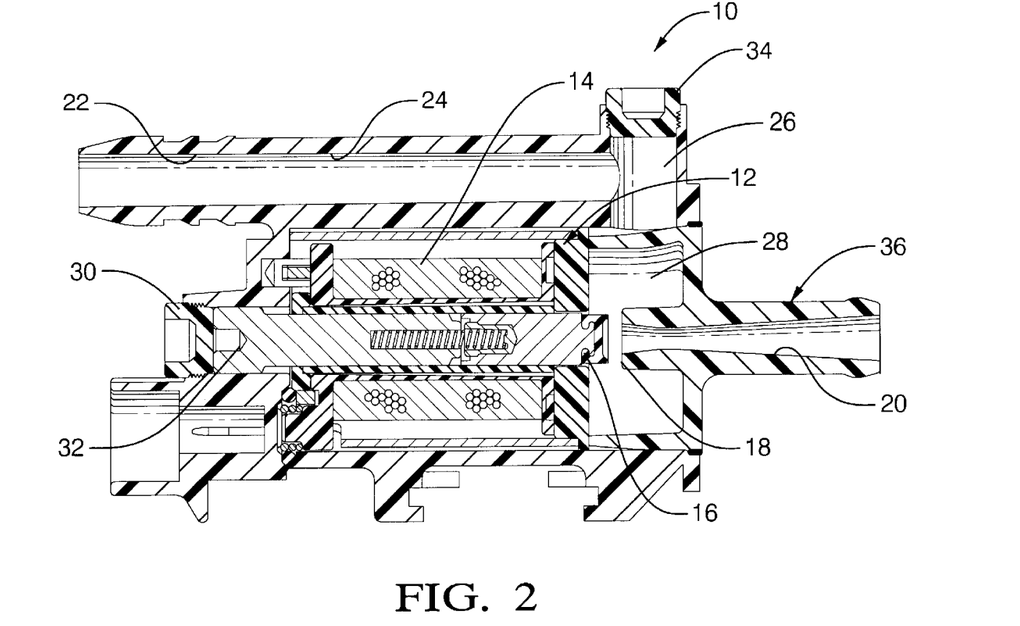
FIG. 2 illustrates an operational position of the solenoid actuated valve assembly depicted in FIG. 1.
Figure 3:
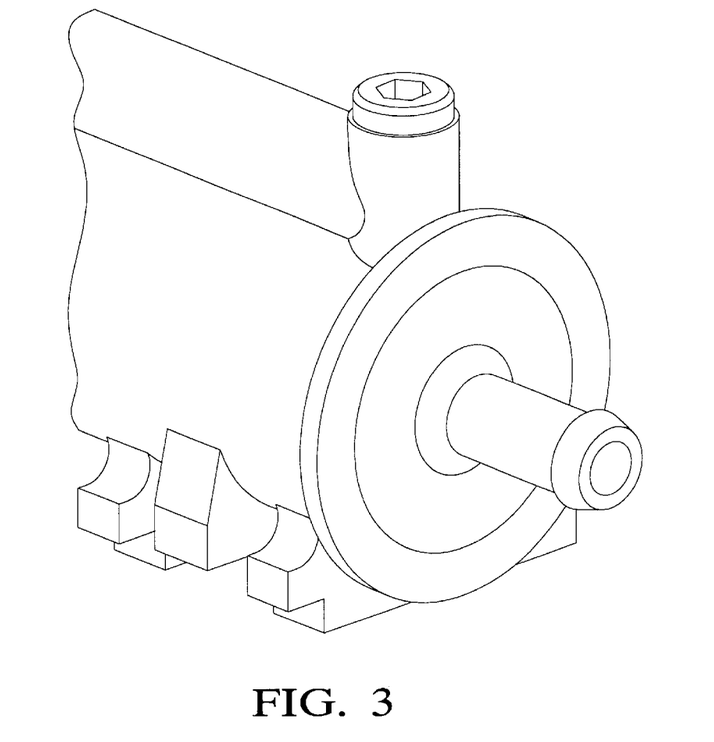
FIG. 3 is a perspective view of a portion of a solenoid actuated valve assembly.

In addition, a side channel 24 connects rear port 20 to a cross slide channel 26. Cross slide 26 connects side channel 24 to a coil chamber 28. Accordingly, and as solenoid 12 manipulates valve 18 from a closed position (FIG. 1) to an open position (FIG. 2), front port 22 is connected to rear port 20.

Valve assembly 10 is positioned for use in an evaporative (EVAP) emission control system of an automobile. The EVAP valve assembly of FIG. 1 also includes a rear plug 30 which is inserted after the stroke of solenoid 12 is adjusted through the manipulation of an adjustment screw portion 32 of a stop 33 to vary the size of an air gap 35 between plunger 16 and stop 33. The size of air gap 35 relates to the stroke of solenoid 12. In addition, a spring 37 is positioned within corresponding cavities within plunger 16 and stop 33. Spring 37 provides an urging force to plunger 16 to return it to its unmanipulated (from solenoid 12) position. Once the stroke of solenoid 12 has been set by the adjustment of screw 32, rear plug 30 is permanently sealed to valve assembly 10.

Cross slide 26 is initially manufactured to have three openings—a first opening into side channel 24, a second opening into valve chamber 28, and a third opening to the exterior of valve assembly 10.

A side plug 34 is permanently secured into the third opening of cross slide 26 in order to complete the passageway from front port 22 to rear port 20. Accordingly, the requirement of side plug 34 is a byproduct of the manufacturing process of valve assembly 10.

A port member 36 is secured to the sidewalls of coil chamber 28 through the use of an ultrasonic weld. However, the ultrasonic welding process may create debris that can accumulate within coil chamber 28 and may be attributable to the failure of the valve assembly. In addition, the ultrasonic welding process deforms the surface of the solenoid valve which will adversely affect the appearance of the final product.

Other problems encountered with the ultrasonic welding process of the port member to the solenoid valve may include improper positioning of the portion of port which makes contact with a portion of plunger 16. This misalignment may cause improper sealing of the valve passageway 18 and may also be the source of an undesirable noise associated with the operation of the solenoid valve (i.e. movement of plunger from the position illustrated in FIG. 1 to the position illustrated in FIG. 2 and back to the position in FIG. 1).

In addition, the sealing of the port member to the solenoid valve assembly provides potential areas for leakage to occur. Moreover, the primary function of an EVAP valve depends on the transfer of gaseous materials from one point to another through the use of an EVAP valve. Accordingly, any leakage will affect the performance of the valve.

Referring now to FIGS. 4–11, a valve assembly 40 or an EVAP valve assembly 40 constructed in accordance with an exemplary embodiment of the present invention is illustrated. EVAP valve assembly 40 has a main body portion 42 and a port 44. In an exemplary embodiment, valve assembly 40 and port 44 are constructed out of a lightweight, durable, nonconductive material, such as plastic, that is easily manufactured and molded.

It is noted that valve assembly 40, body portion 42 and port 44 are configured to remove the need for side plug 34 illustrated in FIG. 1. The removal of plug 34 allows for manufacturing cost reductions, as there are no unnecessary manufacturing steps required for the insertion and welding of plug 34 to an EVAP valve.

Figure 4:
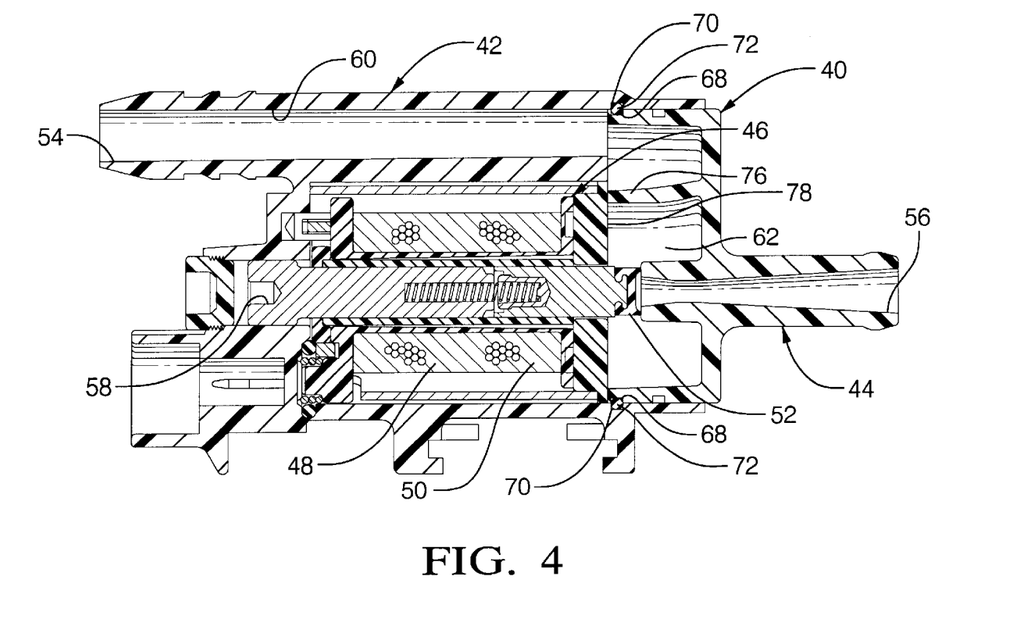
FIG. 4 is a cross-sectional view of a solenoid actuated valve assembly constructed in accordance with the instant application.

Moreover, and since there is no use of a plug 34 as illustrated in FIG. 1, the configuration illustrated in FIG. 4 has fewer seals, and accordingly, a much lower rate of seal failure. In addition, and due to the lesser amount of seals, there is a lesser amount of time required for seal testing.

Alternatively, valve assembly 40, body portion 42, and port 44 may be configured for attachment to a valve assembly having a side plug such as side plug 34.

Valve assembly 40 also includes a solenoid assembly 46. Solenoid assembly 46 is centrally located within valve assembly 40, and in response to a magnetic flux generated by a coil 48, a plunger 50 is manipulated from a closed position to an open position that causes a valve member 52 to open and close a valve passageway. In an exemplary embodiment, valve member 52 is constructed out of a flexible material, such as rubber, capable of sealing the valve passageway. Accordingly, solenoid 46, through the manipulation of valve member 52, provides a means for connecting a rear port 54 to a front port 56. As an alternative, solenoid assembly 46 is replaced by another mechanism capable of manipulating plunger 50 from an open position to a closed position.

Front port 56 is coupled to an intake manifold (not shown) at one end and makes intermittent contact with valve member 52 as it moves from an open position to a closed position. Rear port 54 is coupled to a charcoal canister (not shown) for use in an evaporative emission control system of a vehicle.

Accordingly, and as solenoid assembly 46 manipulates valve 52 from a closed position to an open position, front port 56 is connected to rear port 54.

Figure 5:
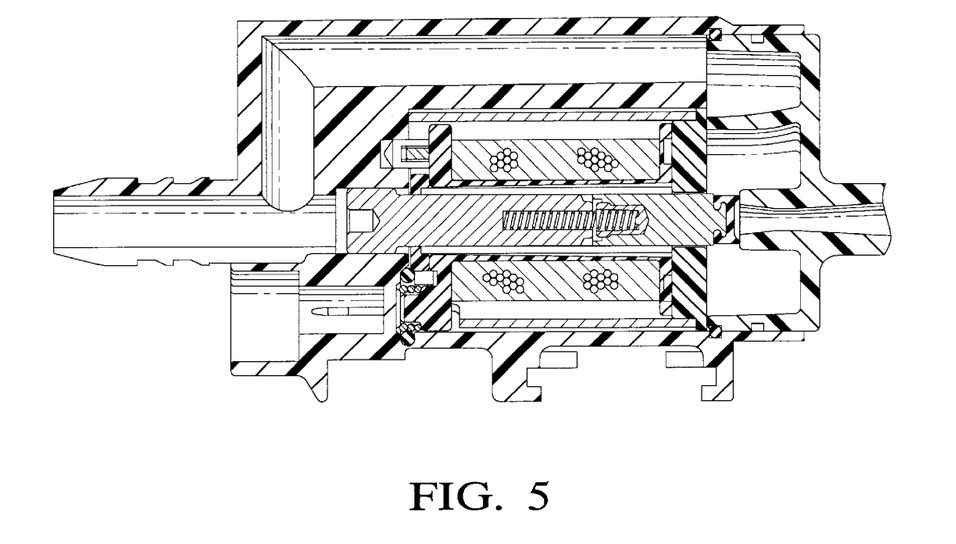
FIG. 5 is a cross-sectional view of an alternative embodiment.

As an alternative, and referring now to FIG. 5, rear port 54 is positioned to align with an adjustment screw portion 58. Adjustment screw portion 58 allows an individual to adjust the stroke of solenoid assembly 46 by varying the position of a stop 59 with respect to plunger 50, thereby varying the size of an air gap 61 (i.e. stroke) between plunger 50 and stop 59. The adjustment of screw 58 will vary the stroke of the solenoid by either varying the biasing force placed upon plunger 50 by a spring or limiting the range of travel for plunger 50 by repositioning stop 59. A tool such as a screwdriver is inserted into port 54 in order to set the stroke of the plunger of the solenoid. This is achieved by rotating adjustment screw portion 58 and accordingly varying the position of stop 59 with respect to plunger 50.

In contrast to the valve illustrated in FIG. 1, there is no requirement for a plug to be inserted and welded to the valve assembly after the stroke of the solenoid has been adjusted. Moreover, and since rear port 54 is configured to align with adjustment screw 58, the adjustment of solenoid assembly 48 may be made at any time during the manufacturing process. This allows for flexibility in the manufacture of valve assembly 40 as well as providing a means for future adjustments to valve assembly 40, if necessary, in aftermarket applications.

A side channel 60 connects rear port 54 to a valve area or chamber 62. Valve chamber 62 is connected to port 56 as valve member 52 moves from a closed position to an open position.

Referring now to FIGS. 4,6,7, 10 and 11, the securement of port member 44 to body portion 42 is illustrated. Port member 44 has an outer annular wall 64. The outside diameter of annular wall 64 is slightly smaller than the inside diameter of valve chamber 62. A groove or receiving area 68 is positioned along the outer surface of annular wall 64. A similar groove or receiving area 70 is positioned along the inner surface of the outer wall defining valve chamber 62. An O-ring 72 is inserted into groove 70 and as annular wall 64 of port member 44 is inserted into valve chamber 62, O-ring 72 is seated within grooves 68 and 70. The outside diameter of annular wall 64 and inside diameter of valve chamber 62 are sufficiently close enough so that the frictional engagement of O-ring 72 within grooves 68 and 70 provides a means for sealing port member 44 within valve chamber 62.

As an alternative, groove 68 is removed from annular wall 64 and groove 70 is configured to retain O-ring 72.

Figure 6:
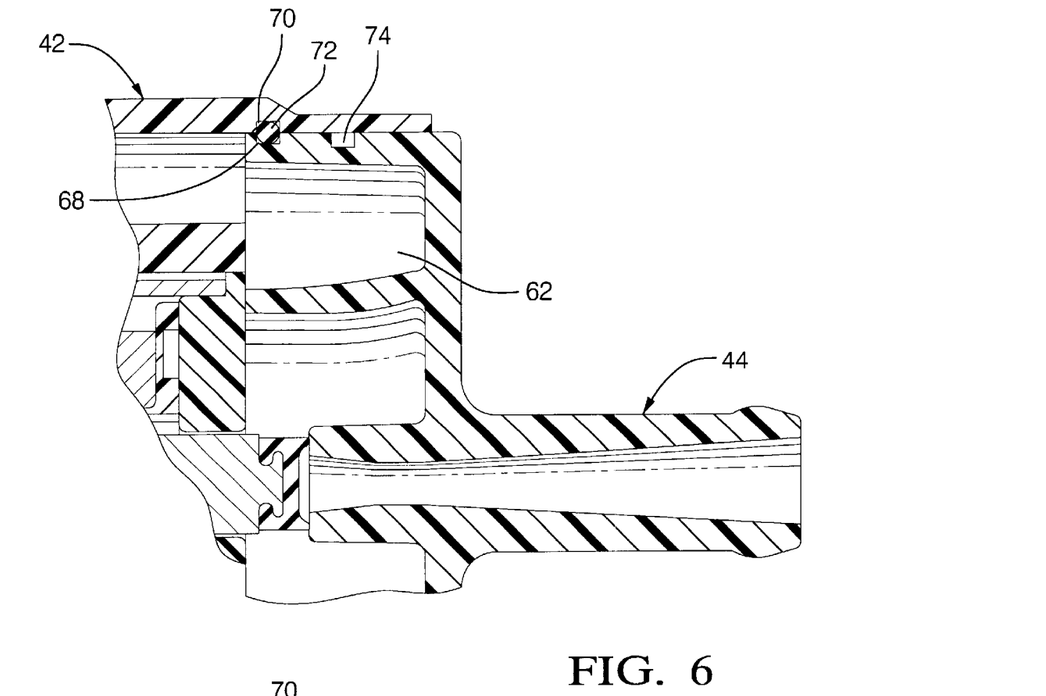
FIG. 6 is a detailed view of a portion of the FIG. 4 embodiment.
Figure 7:
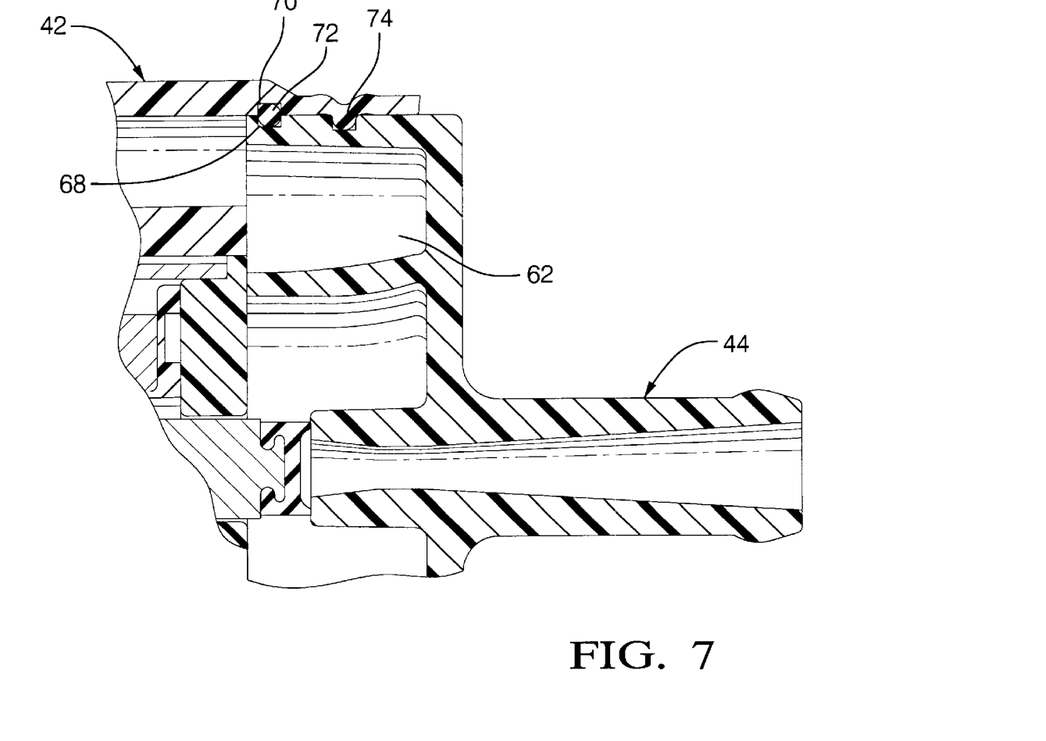
FIG. 7 is a detailed view of the heat staking process of the FIG. 4 embodiment.
Figure 11:
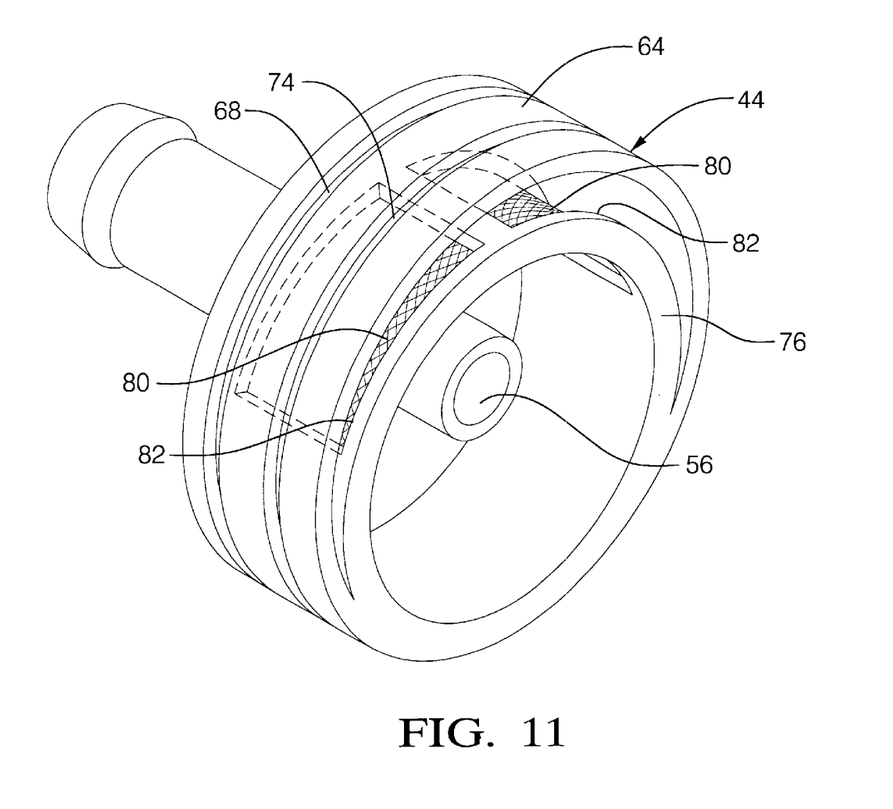
FIG. 11 is a perspective view of a port member for use in the solenoid actuated valve assembly of the instant application.

In addition, and referring now to FIGS. 6 and 11, annular wall 64 has an engagement groove or receiving area 74 positioned along the outer surface of annular wall 64. Referring in particular to FIGS. 6 and 7, and as port member 44 is inserted into its desired position, the outer wall of valve chamber 62 is heat staked into engagement groove 74 (FIG. 7). The heat staking of the outer wall of valve chamber 62 causes a portion of the wall to assume the inwardly curved shape illustrated in FIG. 7. Accordingly, the heat staking of the outer wall of valve chamber 62 causes port member 44 to be fixedly secured to body portion 42 and within valve chamber 62.

It is also noted that the dimension of the outer wall of body portion 42 in close proximity to engagement groove 74 is significantly smaller than the dimension of body portion 42 surrounding solenoid assembly 46. The reduction in the outer wall thickness helps to effectuate the heat staking of body portion 42 to port member 44.

O-ring 72 provides hermetic sealing of port member 44 to body portion 42 while the heat staking of a portion of body portion 42 provides the structural sealing of port member 44. In addition to providing a sealing process in which there is no creation of debris or particulate matter which may adversely affect the performance of valve assembly 40, the use of an O-ring and a heat staking process allows greater flexibility and tolerance for adjusting the position port member 44 prior to its being sealed to body portion 42. This prevents improper alignment of port 56 and valve member 52.

In addition, and if port member is fully inserted into valve chamber 62 until annular wall 76 makes contact with wall 78, the final position of port member 44 will be known. This will greatly assist in the setting of the stroke of the solenoid assembly, as the final position of port member 44 will be known, and accordingly, the plunger of the solenoid assembly can be configured to indicate when valve member 52 is in a position in which it will effectively seal port 56. Therefore, this configuration will require less adjustments to adjustment screw 58 in order to set the stroke of plunger 50.

For example, plunger 50 may be pre-set at a position in which valve member 52 will make contact with port 56 when port member 44 is fully inserted into valve chamber 62. Alternatively, plunger 50 may be pre-set at a position in which valve member 52 will be a known distance away from port 56 when port member 44 is fully inserted into valve chamber 62.

Additionally, and when plunger 50 is preset at a position away from port 56 and since the final position of port 56 will be known, adjustment screw 58 may be calibrated to provide the necessary movement to close the gap between valve member 52 and port 56 by turning adjustment screw a predetermined parameter such as ¼ turn. This will help to automate the assembly and setting of solenoid valve assembly 40.

As an alternative, and as illustrated by the dashed lines in FIGS. 6 and 7, the outer wall of body portion 42 defining valve chamber 62 is configured to extend beyond annular wall 64. This extended portion can be heat staked in order to further facilitate the securement of port member 44 into valve chamber 62. Such heat staking can be a localized re-melt of material into a groove to fix the two pieces together.

In addition, and as port member 44 is being inserted into valve chamber 62, and prior to the heat staking process, port member 44 is seated within valve chamber 62 so as to provide a proper alignment of port 56 with valve member 52. Port member 44 is configured to provide proper alignment of port 56 with valve member 52 when a portion of annular wall 64 and a second inner wall 76 make contact with an outside wall portion 78 of solenoid assembly 46. Accordingly, and in order to properly seat port member 44 within valve chamber 62, port member 44 is inserted until annular walls 76 and 64 make contact with wall 78. Once port member 44 has been inserted into this position, the heat staking process takes place.

By configuring port member 44, namely annular walls 64 and 76 and the positioning of port 56 within annular walls 64 and 76, solenoid assembly 40 is assembled in a manner which will prevent the misalignment of valve member 52 with port 56, and will produce the need for adjustments to the stroke of solenoid assembly 46.

Inner wall member 76 depends outwardly from a portion of annular wall 64 and has an arc-like configuration. Wall member 76 has a pair of openings 80, and the portion of wall member 76 containing openings 80 is positioned a distance away from annular wall 64 in order to allow for the passage of gas vapors etc. from port 56 into valve chamber 62 and ultimately into channel 60.

Figure 8:
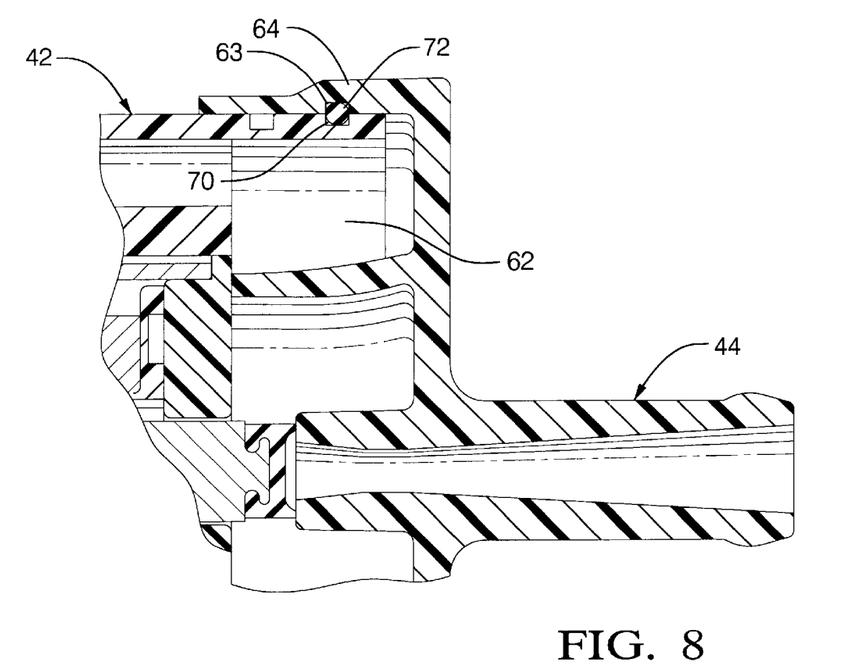
FIG. 8 is a detailed view of a portion of the FIG. 5 embodiment.
Figure 9:
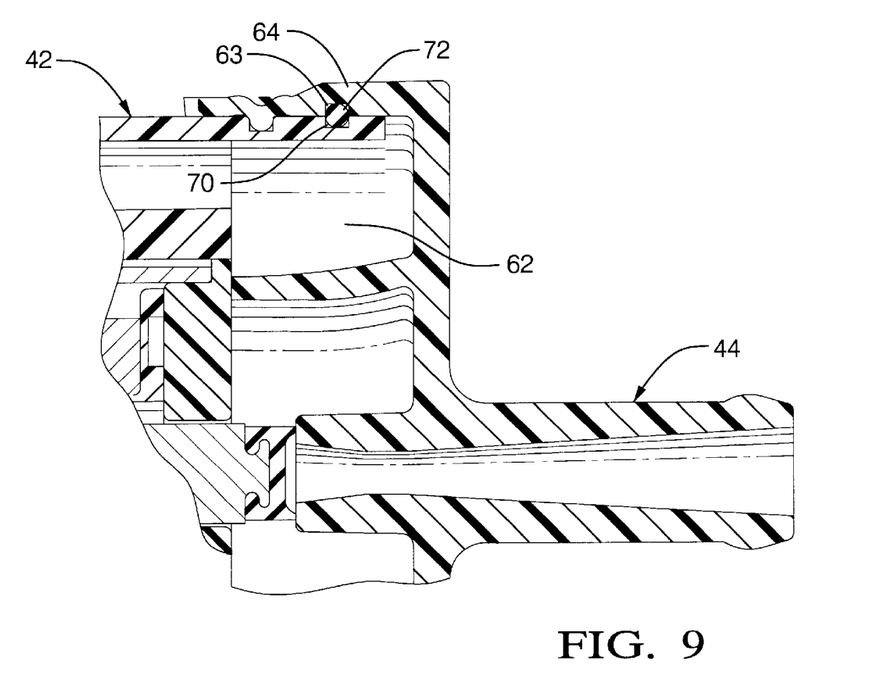
FIG. 9 is a detailed view of the heat staking process of the FIG. 5 embodiment.
Figure 10:
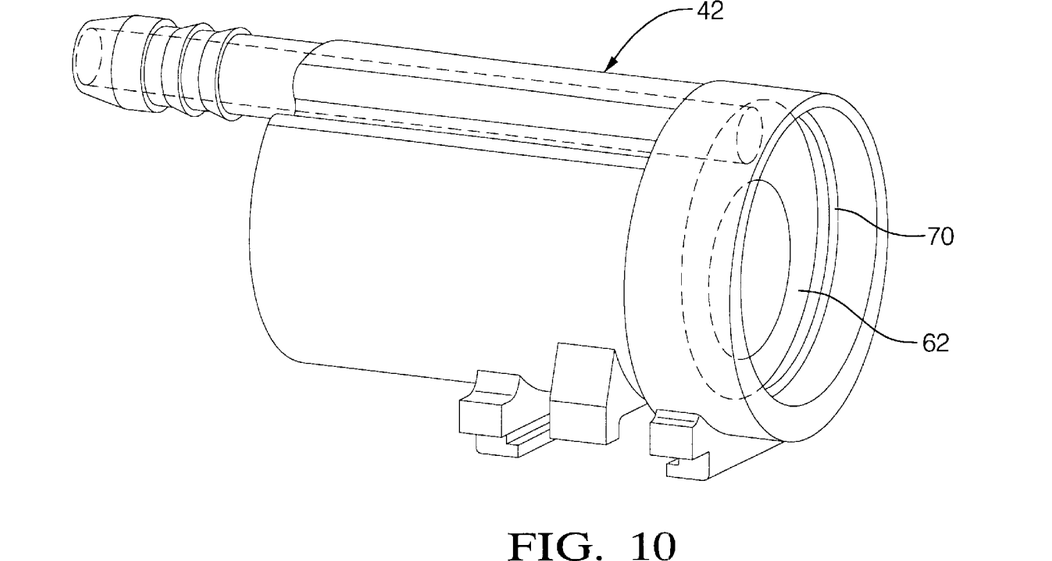
FIG. 10 is a perspective view of a partially assembled solenoid assembly.

As an alternative, and referring now to FIGS. 8 and 9, the outside diameter of annular wall 64 is configured to be slightly larger than the outside diameter of the wall defining valve chamber 62. In this configuration, port member 44 is configured to be placed over a portion of body portion 42.

In this configuration, O-ring 72 is engaged within a pair of grooves 68 and 70 on the inner and outer surfaces of annular wall 64 and body portion 42 respectively. In this embodiment, inner wall 76 is configured to have an annular configuration with an outside diameter smaller than the inside diameter of valve chamber 64. In this embodiment, inner annular wall 76 properly aligns port 56 with valve member 52 when annular wall 76 makes contact with wall 78 of solenoid assembly 46. Once annular wall 76 makes contact with wall 78, annular wall 64 is heat staked (FIG. 9) into an engagement groove 74 positioned on the exterior surface of body portion 42.

In an exemplary embodiment, the outer diameter of valve chamber 62 is slightly larger than the diameter of annular wall 64.

As an alternative, openings 80 of annular wall 76 are fitted with a pair of filters 82. Filters 82 will filter and screen out particulate matter which may accumulate in the fuel tank of a vehicle. This filtering process will prevent such particulate matter from traveling into the filtration device secured to rear port 54. In order to facilitate the securement of filters 82 into openings 80, the periphery of opening 80 may be configured with a groove and/or channel in order to receive and engage the periphery of filters 82.

The design of the EVAP valve assembly allows the assembly to be completed in just two steps, namely, securing port 44 to valve body 42 and using a tool such as a screw driver to manipulate the stroke of the assembly by adjusting screw 58.

The final configuration provides two ports aligned along a common axis with a plunger mechanism of a solenoid positioned intermediate to the two ports and along the same axis. The two ports are connected to each other through a common conduit via a valve chamber and an elbow.

In contrast, and in order to accomplish the same task with multiple seals, the valve assembly illustrated in FIG. 1 requires multiple steps such as insertion and securement of a port member into a valve body, insertion and securement of a side plug into the valve body, adjustment of the stroke of a solenoid assembly, and insertion and securement of a plug into the access area required for the adjustment of the stroke of the solenoid.

This design of the valve assembly also reduces assembly package mass and volume due to the reduction of components. In addition, this results in an overall component cost reduction.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Accordingly, it is to be understood that the present invention has been described by way of illustration and not limitation.

What is claimed is:

1. A solenoid valve assembly, comprising:
   a valve body, comprising:
      a solenoid for generating a magnetic flux for manipulating a plunger between an open position and a closed position, said plunger having a valve end;
      a first annular receiving area;
      a first port; and
      a conduit for connecting said first port to said receiving area, wherein said conduit connects said first annular receiving area to said first port; and
      a port member being configured and dimensioned to be received and engaged within said receiving area, said port member communicating with said receiving area and said valve end sealing said port member when said plunger is in said closed position.

2. The solenoid valve assembly as in claim 1, wherein said port member has an outer diameter slightly smaller than said first annular receiving area.

3. The solenoid valve assembly as in claim 1, wherein said port member has an annular wall being configured, dimensioned and positioned for being received and engaged within said first annular receiving area.

4. The solenoid valve assembly as in claim 1, wherein said port member has an annular wall being configured, dimensioned and positioned for being received and engaged within said first annular receiving area, said annular wall having a first groove positioned along the periphery of said annular wall, said annular receiving area also having a groove positioned along the inner wall of said first annular receiving area, said grooves being positioned to be in a facing spaced relationship when said port member is inserted into said receiving area and an O-ring is received and engaged within said grooves, said O-ring provides an airtight barrier between said port member and the walls of said receiving area.

5. The solenoid valve assembly as in claim 4, wherein said annular wall has a second groove positioned along the periphery of said annular wall, said second groove provides an area for which a portion of said valve body is heat staked into.

6. The solenoid valve assembly as in claim 5, wherein the thickness of said valve body is reduced to provide a heat staking portion, said heat staking portion being positioned in close proximity to said second groove when said port member is inserted into said receiving area.

7. A solenoid valve assembly, comprising:
   a valve body, comprising:
      i) a solenoid for generating a magnetic flux for manipulating a plunger between an open position and a closed position, said plunger having a valve end;
      ii) a receiving area;
      iii) a first port; and
      iv) a conduit for connecting said first port to said receiving area;
   a port member being configured and dimensioned to be received and engaged within said receiving area, said port member communicating with said receiving area and said valve end sealing said port member when said plunger is in said closed position, wherein said port member has an annular wall being configured, dimensioned and positioned to receive and engage a portion of said valve body defining said receiving area.

8. The solenoid valve assembly as in claim 7, wherein said annular wall has a first groove positioned along the periphery of said annular wall, said portion of said valve body also having a groove, said grooves being positioned to be in a facing spaced relationship when said portion of said valve body is inserted into said annular wall of said port member and an O-ring is received and engaged within said grooves, said O-ring provides an airtight barrier between said port member and the walls of said receiving area.

9. The solenoid valve assembly as in claim 8, wherein said portion of said valve body has a second groove positioned along the periphery of said receiving area, said second groove provides an area for which a portion of said annular wall is heat staked into.

10. An evaporative control valve for a vehicle, comprising:
    a valve body, comprising:
       a solenoid for manipulating a plunger between an open position and a closed position, said plunger having a valve end;
       a receiving area;
       a first port; and
       a conduit for connecting said first port to said receiving area;
       a port member being configured and dimensioned to be received and engaged within said receiving area, said port member providing a passageway from said receiving area to outside said valve body and said valve end sealing said passageway when said plunger is in said closed position, wherein said receiving area of said solenoid valve body has a first annular receiving area and a second annular receiving area, said first annular receiving area having a diameter larger than said second annular receiving area.

11. The evaporative control valve as in claim 10, wherein said conduit connects said first annular receiving area to said first port.

12. The evaporative control valve as in claim 10, wherein said opening receives and engages a filter member.

13. A solenoid valve assembly, comprising:
    a valve body configured to have a receiving area, a first port and conduit for fluidly connecting said receiving area to said first port;
    a port member being configured to be received within said receiving area, said port member having an opening being in fluid communication with said receiving area and an exterior of said valve body when said port member is inserted into said receiving area, said port member having an annular wall being configured to be received within said receiving area, said annular wall having a first groove positioned along the periphery of said annular wall, an O-ring being received and engaged within said first groove, said O-ring provides an airtight barrier between said port member and the walls of said receiving area.

14. The solenoid valve assembly as in claim 13, wherein said receiving are also has a groove positioned along an inner wall of said receiving area, said groove being positioned to be in a facing spaced relationship with respect to said first groove when said port member is inserted into said receiving area.

15. The solenoid valve assembly as in claim 13, wherein said annular wall has a second groove positioned along the periphery of said annular wall, said second groove provides an area for which a portion of said valve body is heat staked into.

16. The solenoid valve assembly as in claim 15, wherein the thickness of said valve body is reduced to provide a heat staking portion, said heat staking portion being positioned in close proximity to said second groove when said port member is inserted into said receiving area.

17. The solenoid valve assembly as in claim 13, further comprising:
   a plunger being slidably received within said valve body, said plunger being capable of movement in a range defined by an open position and a closed position, said plunger having a valve end, said valve end sealing said opening of said port member when said plunger is in said closed position.

18. A solenoid valve assembly as in claim 17, wherein said plunger is moved in said range by a magnetic flux generated by a solenoid of said solenoid valve assembly.

19. The solenoid valve assembly as in claim 13, wherein said port member has an inner annular wall disposed within said annular wall said inner annular wall allowing for fluid communication between said conduit and said receiving area.

20. The solenoid valve assembly as in claim 19, wherein said inner annular wall has a least one screen disposed therein.

21. A method for setting the stroke of a valve assembly, comprising:
   inserting a port member into a receiving opening of the solenoid valve assembly;
   relocating a valve end of a plunger of the valve assembly by contacting said valve end with a valve opening of said port member;
   abutting an annular wall of said port member to a surface of said receiving areas; and
   heat-staking a portion of said port member to the valve assembly.

22. A valve assembly, comprising:
   a valve body having an annular receiving area;
   a conduit being in fluid communication with said annular receiving area;
   a port member being configured to be received within said annular receiving area, said port member having an opening being in fluid communication with said receiving area and an exterior of the valve assembly when said port member is inserted into said receiving area, said port member having an annular wall being configured to be received within said receiving area, said annular wall having a first groove positioned along the periphery of said annular wall, an O-ring being received and engaged within said first groove, said O-ring provides an airtight barrier between said port member and the walls of said receiving area.

23. The valve assembly as in claim 22, wherein said annular wall has a second groove positioned along the periphery of said annular wall, said second groove provides an area for which a portion of said valve body is heat staked into.

24. The valve assembly as in claim 23, wherein the thickness of said valve body is reduced to provide a heat staking portion, said heat staking portion being positioned in close proximity to said second groove when said port member is inserted into said receiving area.

25. The valve assembly as in claim 23, wherein said port member and said valve body are plastic.

* * * * *